United States Patent
Henseler et al.

(10) Patent No.: US 8,387,037 B2
(45) Date of Patent: Feb. 26, 2013

(54) UPDATING SOFTWARE IMAGES ASSOCIATED WITH A DISTRIBUTED COMPUTING SYSTEM

(75) Inventors: David A. Henseler, Maplewood, MN (US); Jeanne C. Gilbertson, Chanhassen, MN (US); Margaret Cahir, St. Paul, MN (US)

(73) Assignee: CA, Inc., Islandia, NY (US)

( * ) Notice: Subject to any disclaimer, the term of this patent is extended or adjusted under 35 U.S.C. 154(b) by 2373 days.

(21) Appl. No.: 11/046,152

(22) Filed: Jan. 28, 2005

(65) Prior Publication Data

US 2006/0174238 A1  Aug. 3, 2006

(51) Int. Cl.
*G06F 9/44* (2006.01)

(52) U.S. Cl. .......................... 717/168; 717/170; 717/172

(58) Field of Classification Search .................. None
See application file for complete search history.

(56) References Cited

U.S. PATENT DOCUMENTS

| | | | |
|---|---|---|---|
| 5,049,873 A | 9/1991 | Robins et al. | |
| 5,715,396 A | 2/1998 | Chatwani et al. | |
| 5,751,967 A | 5/1998 | Raab et al. | |
| 5,774,377 A | 6/1998 | Eidson et al. | |
| 5,819,281 A | 10/1998 | Cummins | |
| 5,956,515 A | 9/1999 | Beals et al. | |
| 6,018,747 A * | 1/2000 | Burns et al. | 707/203 |
| 6,115,713 A | 9/2000 | Pascucci et al. | |
| 6,134,594 A | 10/2000 | Helland et al. | |
| 6,202,091 B1 | 3/2001 | Godse | |
| 6,226,788 B1 | 5/2001 | Schoening et al. | |
| 6,259,448 B1 | 7/2001 | McNally et al. | |
| 6,282,568 B1 | 8/2001 | Sondur et al. | |
| 6,334,146 B1 | 12/2001 | Parasnis et al. | |
| 6,430,622 B1 | 8/2002 | Aiken et al. | |
| 6,484,261 B1 | 11/2002 | Wiegel | |
| 6,532,465 B2 | 3/2003 | Hartley et al. | |
| 6,535,915 B1 * | 3/2003 | Valys et al. | 709/222 |
| 6,535,977 B1 | 3/2003 | Holle et al. | |
| 6,549,943 B1 | 4/2003 | Spring | |
| 6,711,613 B1 | 3/2004 | Ewing et al. | |
| 6,735,757 B1 * | 5/2004 | Kroening et al. | 717/120 |
| 6,754,703 B1 | 6/2004 | Spring | |
| 6,775,423 B2 * | 8/2004 | Kulkarni et al. | 382/305 |
| 6,775,829 B1 | 8/2004 | Kroening | |

(Continued)

FOREIGN PATENT DOCUMENTS

WO  WO/03/085526 A1  10/2003

OTHER PUBLICATIONS

Sameer Ajmani, "Automatic Software Upgrades for Distributed Systems", Aug. 18, 2004, Massachusetts Institute of Technology, pp. 1-164; <http://reference.kfupm.edu.sa/content/a/u/automatic_software_upgrades_for_distribu_102651.pdf>.*

(Continued)

*Primary Examiner* — Thuy Dao
*Assistant Examiner* — Ben C Wang
(74) *Attorney, Agent, or Firm* — Baker Botts L.L.P.

(57) ABSTRACT

In general, the invention is directed to updating images running on computing nodes within a distributed computing system. For example, a distributed computing system comprises a plurality of application nodes, a software image repository and a control node interconnected via a network. The image repository stores a master software image and a plurality of software image instances generated from the master software image. The control node automatically updates each of the software image instances using an updated version of the master software image.

18 Claims, 8 Drawing Sheets

U.S. PATENT DOCUMENTS

| | | | |
|---|---|---|---|
| 6,847,993 B1 | 1/2005 | Novaes et al. | |
| 6,865,737 B1 | 3/2005 | Lucas et al. | |
| 6,912,221 B1 | 6/2005 | Zadikian et al. | |
| 6,920,493 B1 | 7/2005 | Schwab | |
| 6,944,662 B2 | 9/2005 | Devine et al. | |
| 7,055,040 B2 | 5/2006 | Klemba et al. | |
| 7,203,731 B1 | 4/2007 | Coates et al. | |
| 7,266,805 B2* | 9/2007 | Weidman et al. | 717/101 |
| 7,516,206 B2* | 4/2009 | Henseler et al. | 717/168 |
| 7,546,594 B2* | 6/2009 | McGuire et al. | 717/168 |
| 7,574,706 B2* | 8/2009 | Meulemans et al. | 717/174 |
| 7,752,617 B2* | 7/2010 | Blinick et al. | 717/170 |
| 2002/0029227 A1* | 3/2002 | Multer et al. | 707/203 |
| 2002/0099726 A1* | 7/2002 | Crudele et al. | 707/200 |
| 2002/0156877 A1 | 10/2002 | Lu et al. | |
| 2002/0161751 A1 | 10/2002 | Mulgund et al. | |
| 2003/0033191 A1 | 2/2003 | Davies et al. | |
| 2003/0036875 A1 | 2/2003 | Peck et al. | |
| 2003/0051020 A1 | 3/2003 | Kadam et al. | |
| 2003/0061344 A1 | 3/2003 | Monroe | |
| 2003/0084052 A1 | 5/2003 | Peterson | |
| 2003/0084156 A1 | 5/2003 | Graupner et al. | |
| 2003/0097438 A1 | 5/2003 | Bearden et al. | |
| 2003/0120780 A1 | 6/2003 | Zhu et al. | |
| 2003/0126265 A1 | 7/2003 | Aziz et al. | |
| 2003/0131078 A1 | 7/2003 | Scheer et al. | |
| 2003/0140282 A1 | 7/2003 | Kaler et al. | |
| 2003/0177176 A1 | 9/2003 | Hirschfeld et al. | |
| 2003/0195957 A1 | 10/2003 | Banginwar | |
| 2003/0229792 A1 | 12/2003 | Baldwin et al. | |
| 2004/0088694 A1* | 5/2004 | Ho | 717/170 |
| 2004/0103193 A1 | 5/2004 | Pandya et al. | |
| 2004/0123141 A1 | 6/2004 | Yadav | |
| 2004/0162741 A1 | 8/2004 | Flaxer et al. | |
| 2004/0168165 A1* | 8/2004 | Kokkinen | 717/168 |
| 2004/0181794 A1 | 9/2004 | Coleman et al. | |
| 2004/0187104 A1* | 9/2004 | Sardesai et al. | 717/174 |
| 2004/0201611 A1 | 10/2004 | Bagsby | |
| 2004/0253956 A1 | 12/2004 | Collins | |
| 2004/0260734 A1* | 12/2004 | Ren et al. | 707/203 |
| 2005/0005200 A1 | 1/2005 | Matena et al. | |
| 2005/0027831 A1 | 2/2005 | Anderson et al. | |
| 2005/0027865 A1 | 2/2005 | Bozak et al. | |
| 2005/0091227 A1 | 4/2005 | McCollum et al. | |
| 2005/0091348 A1 | 4/2005 | Ferri et al. | |
| 2005/0114685 A1* | 5/2005 | Blinick et al. | 713/191 |
| 2005/0132350 A1* | 6/2005 | Markley et al. | 717/168 |
| 2005/0193265 A1 | 9/2005 | Lin et al. | |
| 2005/0246301 A1 | 11/2005 | Lin et al. | |
| 2005/0257205 A1* | 11/2005 | Costea et al. | 717/168 |
| 2005/0278399 A1* | 12/2005 | Herle et al. | 708/100 |
| 2005/0289533 A1* | 12/2005 | Wang et al. | 717/168 |
| 2006/0015773 A1 | 1/2006 | Singh et al. | |
| 2006/0047789 A1 | 3/2006 | Kumar et al. | |
| 2006/0173856 A1 | 8/2006 | Jackson et al. | |
| 2006/0173857 A1 | 8/2006 | Jackson | |
| 2006/0173895 A1 | 8/2006 | Engquist et al. | |
| 2006/0173984 A1 | 8/2006 | Emeis et al. | |
| 2006/0173994 A1 | 8/2006 | Emeis et al. | |
| 2006/0179106 A1 | 8/2006 | Turner et al. | |
| 2006/0200494 A1 | 9/2006 | Sparks | |
| 2007/0233698 A1 | 10/2007 | Sundar et al. | |
| 2008/0177821 A1 | 7/2008 | Tsao | |
| 2008/0215734 A1 | 9/2008 | Walker et al. | |
| 2009/0150878 A1* | 6/2009 | Pathak et al. | 717/172 |
| 2009/0235245 A1* | 9/2009 | Andersson | 717/172 |
| 2011/0078675 A1* | 3/2011 | Van Camp et al. | 717/170 |
| 2011/0113414 A1* | 5/2011 | Ewington et al. | 717/168 |
| 2011/0113420 A1* | 5/2011 | Ewington et al. | 717/168 |
| 2011/0289495 A1* | 11/2011 | Mulligan et al. | 717/168 |

OTHER PUBLICATIONS

Valerio Panzica La Manna, "Dynamic Software Update for Component-based Distributed Systems", Jun. 20, 2011, ACM, pp. 1-8; <http://dl.acm.org/citation.cfm?doid=2000292.2000294>.*

Park et al., "Dynamic Software Updates in Cyber-Physical Systems", 2010 IEEE, pp. 425-426; <http://ieeexplore.ieee.org/stamp/stamp.jsp?tp=&arnumber=5674807>.*

Office Action dated Jan. 2, 2008, for U.S. Appl. No. 11/176,161, (21 pages).

Office Action dated Jan. 2, 2008, for U.S. Appl. No. 11/191,384, (30 pages).

Notification of Transmittal of the International Search Report and the Written Opinion of the International Searching Authority for corresponding patent application No. PCT/US2006/002986, mailed Jun. 21, 2006, 13 pages.

International Preliminary Report on Patentability from corresponding PCT Application Serial No. PCT/US2006/002986 mailed Aug. 9, 2007 (9 pages).

Office Action dated Sep. 14, 2007 for U.S. Appl. No. 11/070,851, filed Mar. 2, 2005, (22 pages).

Office Action dated Oct. 4, 2007 for U.S. Appl. No. 11/046,133, filed Jan. 28, 2005, (19 pages).

Office Action dated Mar. 19, 2007 for U.S. Appl. No. 11/176,161, filed Jul. 7, 2005, (29 pages).

B. Urgaonkar et al., "Resource Overbooking and Application Profiling in Shared Hosting Platforms," Proceedings of the $5^{th}$ Symposium on Operating Systems Design and Implementation, pp. 239-254, 2002.

G. Lodi et al., "QoS-aware Clustering of Application Servers," Proceedings of the $1^{st}$ IEEE Workshop on Quality of Service for Application Servers, in Conjunction With the $23^{rd}$ International Symposium on Reliable Distributed Systems, 3 pages, Oct. 17, 2004.

E.N. Herness et al., "WebSphere Application Server: A Foundation for on Demand Computing," IBM Systems Journal IBM, vol. 43, No. 2, pp. 213-237, 2004.

*Preinstalling Microsoft Windows XP by Using the OEM Preinstallation Kit, Part 1*, XP-002301441, Apr. 4, 2003, 24 pages.

Brown et al., "Cisco Cookbook", Jul. 1, 2003, O'Reilly & Associates, Inc., First edition, Safari Books Online, http://proquest.safaribooksonline.com/print?xmlid=0596003676/ciscockbk-PREFACE-1 (12 pages).

Office Action dated Mar. 24, 2008, for U.S. Appl. No. 11/070,851, (28 pages).

Office Action dated Apr. 18, 2008, for U.S. Appl. No. 11/047,468 (21 pages).

Office Action dated Apr. 18, 2008, for U.S. Appl. No. 11/074,291, (33 pages).

Office Action dated May 1, 2008, for U.S. Appl. No. 11/191,882, (33 pages).

Office Action dated May 2, 2008, for U.S. Appl. No. 11/046,133, (24 pages).

Notice of Allowance dated Aug. 17, 2009, for U. S. Appl. No. 11/047,468, (10 pages).

Office Action dated Jun. 1, 2009, for U.S. Appl. No. 11/047,468, (21 pages).

Office Action dated May 1, 2009, for U.S. Appl. No. 11/074,291, (8 pages).

Notice of Allowance dated Jul. 16, 2008, for U.S. Appl. No. 11/176,161, (10 pages).

Notice of Allowance dated Oct. 10, 2008, for U.S. Appl. No. 11/191,384, (9 pages).

Notice of Allowance dated Mar. 17, 2009, for U.S. Appl. No. 11/191,882, (16 pages).

Notice of Allowance dated Nov. 26, 2008, for U.S. Appl. No. 11/046,133, (4 pages).

Notice of Allowance dated Apr. 13, 2009, for U.S. Appl. No. 11/070,851, (18 pages).

Office Action dated Oct. 30, 2008 for U.S. Appl. No. 11/047,468, (21 pages).

Office Action dated Sep. 19, 2008 for U.S. Appl. No. 11/070,291, (35 pages).

Office Action dated Oct. 6, 2008 for U.S. Appl. No. 11/191,882, (34 pages).

Office Action dated Sep. 26, 2008 for U.S. Appl. No. 11/070,851, (10 pages).

Office Action dated Jul. 21, 2008 for U.S. Appl. No. 11/191,384, (34 pages).

* cited by examiner

FIG. 1

| IMAGE TYPE | INSTANCE ID | IP ADDRESS | STATUS | VERSION |
|---|---|---|---|---|
| WEB SERVER IMAGE | GOLDEN | --- | INACTIVE | 1.0 |
| WEB SERVER IMAGE | 1.1 | 12.1.56.2 | INACTIVE | 1.0 |
| WEB SERVER IMAGE | 2.1 | 12.1.56.3 | INACTIVE | 1.0 |
| WEB SERVER IMAGE | 3.1 | 12.1.56.4 | INACTIVE | 1.0 |
| WEB SERVER IMAGE | 4.1 | 12.1.56.5 | INACTIVE | 1.0 |
| WEB SERVER IMAGE | GOLDEN | --- | INACTIVE | 2.0 |
| WEB SERVER IMAGE | 1.2 | 12.1.56.2 | ACTIVE | 2.0 |
| WEB SERVER IMAGE | 2.2 | 12.1.56.3 | ACTIVE | 2.0 |
| WEB SERVER IMAGE | 3.2 | 12.1.56.4 | INACTIVE | 2.0 |
| WEB SERVER IMAGE | 4.2 | 12.1.56.5 | INACTIVE | 2.0 |
| APPLICATION SERVER IMAGE | GOLDEN | --- | INACTIVE | 1.0 |
| APPLICATION SERVER IMAGE | 1.1 | 12.1.56.19 | ACTIVE | 1.0 |
| APPLICATION SERVER IMAGE | 2.1 | 12.1.56.19 | INACTIVE | 1.0 |

UPDATING SOFTWARE IMAGES ASSOCIATED WITH A DISTRIBUTED COMPUTING SYSTEM

TECHNICAL FIELD

The invention relates to computing environments and, more specifically, to management of computing nodes of a distributed processing systems.

BACKGROUND

Distributed computing systems are increasingly being utilized to support high-performance computing applications. Typically, distributed computing systems are constructed from a collection of computing nodes that combine to provide a set of processing services to implement the high performance computing applications. Each of the computing nodes in the distributed computing system is typically a separate, independent computing device interconnected with each of the other computing nodes via a communications medium, e.g., a network.

One of the challenges with distributed computing systems is the management of the software images associated with the computing nodes. The term "software image" generally refers to the complete set of software associated with an individual computing node, including the operating system and all boot code, middleware and application files.

One challenge arises when a new computing node is allocated to the distributed computing system. In this situation, the computing node must be loaded with a software image that is consistent with the current software images running on the related computing nodes. Similarly, it may be necessary to load a new software image on a computing node when the functions of computing node change within the distributed computing system.

Moreover, other challenges arise when installing new software, updating software versions or applying software patches to the software images associated with the computer nodes. For example, it is often necessary to shutdown and reboot a computing node when installing or updating software on the computing node. In some situations, it may even be necessary to take the entire distributed computing system offline when performing substantial software installations or updates. As a result, the computing performance of the distributed computing system may be severely impacted during the installation or update process.

SUMMARY

In general, the invention is directed to software image management within a distributed computing system. In particular, the invention provides techniques for the efficient allocation and management of software images within the distributed computing system. A control node, for example, generates a "golden image" for each type of software image that may be deployed on one or more of application nodes.

As described herein, the term "golden image" refers to a reference copy of a complete software stack that may be deployed on application node to achieve identical functionality. In other words, a golden image may be viewed as a "master copy" of the software image for a particular computing function. The control node may create a copy of a golden image, referred to as an "image instance," for each of possible application node that may be deployed within distributed computing system. In other words, the control node pre-generates a set of K image instances, where K represents the maximum number of application nodes for a particular computing function. Control node may create the set of K image instance regardless of whether the actual number of application nodes initially deployed to perform that function is less than K. Moreover, the control node creates a complete set of image instances for each computing function that may be deployed within the distributed computing system.

In one embodiment, a method comprises storing a master software image for a type of computing function to be deployed within a distributed computing system, and generating a plurality of software image instances from the master software image for deployment within the distributed computing system. The method further comprises applying a software update to the master software image to generate an updated master software image, and updating each of the software image instances using the updated master software image.

In another embodiment, a distributed computing system comprises a plurality of application nodes, a software image repository and a control node interconnected via a network. The image repository stores a master software image and a plurality of software image instances generated from the master software image. The control node automatically updates each of the software image instances using an updated version of the master software image.

In another embodiment, a computer-readable medium comprises instructions that cause a programmable process to access an image repository and select one of a plurality of software image instances generated from a master software image; select one of the image instances; create a copy of the selected image instance; compute a first set of differences $S_1$ that specifies any differences between the master software image and an updated version of master software image; and apply the first set of differences $S_1$ to the copy of the selected image instance.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
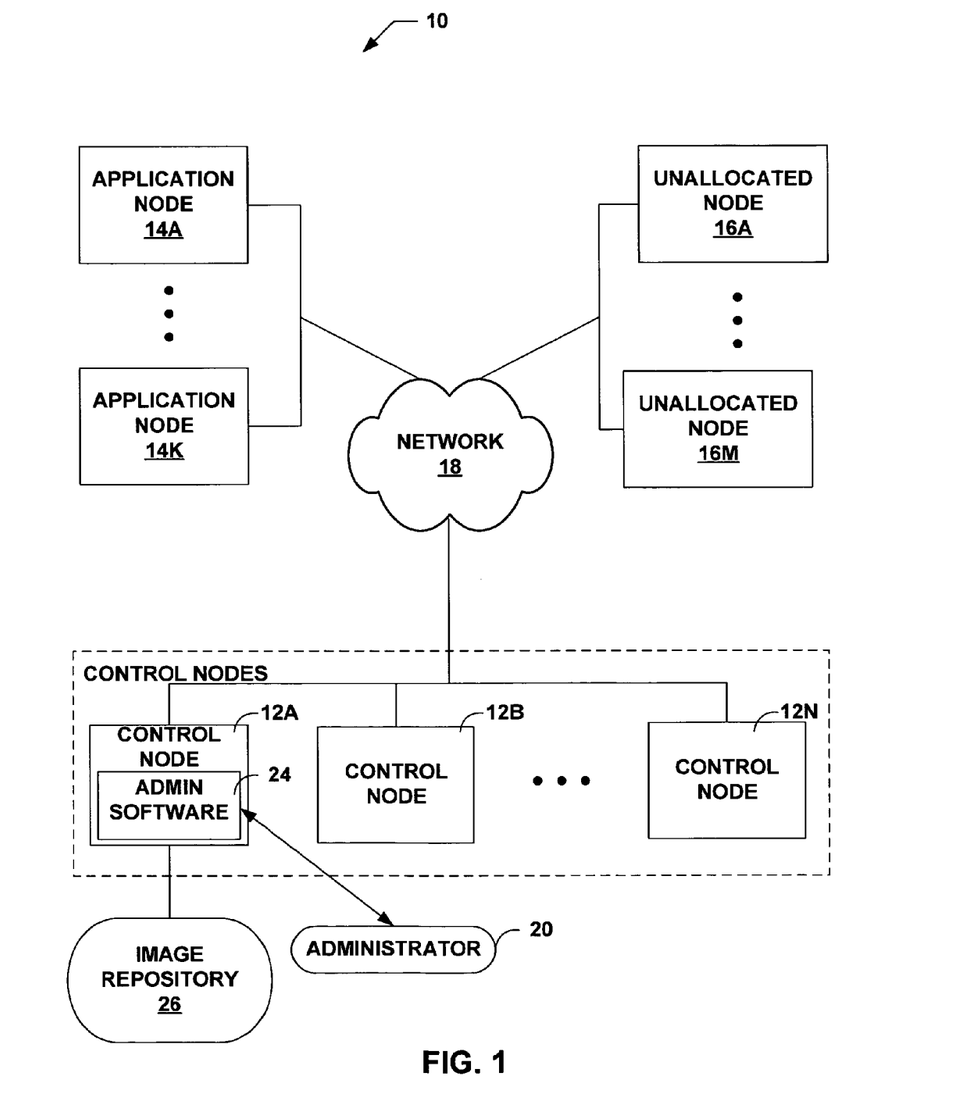
FIG. 1 is a block diagram illustrating a distributed computing system constructed from a collection of computing nodes.

FIG. 1 is a block diagram illustrating a distributed computing system 10 constructed from a collection of computing nodes. Distributed computing system 10 may be viewed as a collection of computing nodes operating in cooperation with each other to provide high-performance processing.

In one embodiment, the collection of computing nodes forming distributed computing system 10 includes control nodes 12A-12N ("control nodes 12"), application nodes 14A-14K ("application nodes 14") and unallocated nodes 16A-16M ("unallocated nodes 16"). Control nodes 12, application nodes 14 and unallocated nodes 16 are interconnected via a communications network 18. Communications network 18 permits internode communications among the computing nodes as the nodes perform interrelated operations and functions. Communications network 18 may comprise, for example, direct connections between one or more of the computing nodes, one or more customer networks maintained by an enterprise, local area networks (LANs), wide area networks (WANs) or a combination thereof.

Within distributed computing system 10, a computing node represents an individual physical computing device. The number of computing nodes needed within distributed computing system 10 is dependent on the processing requirements. For example, distributed computing system 10 may include 8 to 512 computing nodes or more. Each computing node includes one or more programmable processors for executing software instructions stored on one or more computer-readable media.

As illustrated in FIG. 1, the computing nodes of distributed computing system 10 are divided into application nodes 14, control nodes 12, and unallocated nodes 16. In general, application nodes 14 provide computing environments for execution of user software applications. In addition, although not illustrated separately, application nodes 14 may include one or more input/output (I/O) nodes. Application nodes 14 typically have more substantial I/O capabilities than control nodes 12, and are typically configured with more computing resources (e.g., processors and memory).

In contrast, control nodes 12 provide the system support functions for managing distributed computing system 10. More specifically, control nodes 12 manage the roles of each computing node within distributed computing system 10 and the installation and execution of software applications within the distributed computing system. In general, distributed computing system 10 includes at least one control node, such as control node 12A, and, optionally, additional control nodes 12B-12N.

Unallocated nodes 16 represent computing nodes that are available for use in distributed computing system 10, but that are not currently configured and deployed within the distributed computing system 10. Unallocated nodes 16 may, for example, be used to replace failed application nodes or to add application nodes to distributed computing system 10 to increase processing capacity.

In the example of FIG. 1, control node 12A is responsible for software image management as described in detail herein. The term "software image" refers to a complete set of software associated with an individual computing node, including the operating system and all boot code, middleware and application files. Other control nodes 12 are optional and may be associated with a different subset of the computing nodes within distributed computing system 10. Moreover, control node 12A may be replicated to provide primary and backup administration functions, thereby allowing for graceful handling a failover in the event control node 12A fails.

In one embodiment, each of the computing nodes within distributed computing system 10 execute a common general-purpose operating system. One example of a general-purpose operating system is the Windows™ operating system provided by Microsoft Corporation. In some embodiments, the general-purpose operating system may be the Linux kernel.

In general, a system administrator 20 accesses administration software 24 ("admin software 24" in FIG. 1) executing on control node 12A to define the architecture of distributed computing system 10. For example, system administrator 20 may define the maximum number of application nodes 14 for distributed computing system 10, the software and hardware resources for each application node, the function of each application node (e.g., web server node), and the like. In some embodiments, control nodes 12 automatically detect the hardware resources for each of application nodes 14 and unallocated nodes 16.

System administrator 20 may further identify the particular types of software images to be installed on application nodes 14. Alternatively, administration software 24 executing on control node 12A will automatically identify the appropriate software images to be deployed to application nodes 14 based on the input received from the system administrator. For example, administration software 24 may determine the type of software image to associate with an application node 14 based on the functions assigned to the node by system administrator 20. Application nodes 14 may be divided into a number of groups based on their assigned functionality. As one example, application nodes 14 may be divided into a first group to provide web server functions, a second group to provide business application functions and a third group to provide database functions. The application nodes 14 of each group may be associated with different software images.

As described herein, a control node, such as control node 12A, provides for the efficient allocation and management of various software images within distributed computing system 10. In some embodiments, control node 12A generates a "golden image" for each type of software image that may be deployed on one or more of application nodes 14. As described herein, the term "golden image" refers to a reference copy of a complete software stack.

System administrator 20 may create a golden image by installing an operating system, middleware and software applications on a computing node and then making a complete copy of the installed software. In this manner, a golden image may be viewed as a "master copy" of the software image for a particular computing function. In the example described above, control node 12A may generate corresponding golden images for a web server function, a business application function and a database application function. Control node 12A maintains a software image repository 26 that stores the golden images associated with distributed computing system 10.

In accordance with the invention, control node 12A may create a copy of a golden image, referred to as an "image instance," for each possible image instance that may be deployed within distributed computing system 10 for a similar computing function. In other words, control node 12A pre-generates a set of K image instances, where K represents the maximum number of image instances for which distributed computing system 10 is configured for the particular type of computing function. For a given computing function, control node 12A creates the set of image instance even if not all of the image instances will be initially deployed. Control node 12A creates different sets of image instances for different computing functions, and each set may have a different number of image instances depending on the maximum number of image instances that may be deployed for each set. Control node 12A stores the image instances within software image repository 26. Each image instance represents a collection of bits that may be deployed on an application node.

For example, if administrator 20 configures distributed computing system 10 to have a maximum of five image instances for a particular type of computing function (i.e., K=5), then control node 12A creates five image instances from the corresponding golden image. In a similar fashion, control node 12A pre-generates the image instances for each functional grouping of application nodes 14. Continuing with the example, control node 12A may create software image instances including: (1) a first group having a maximum of five software image instances that may be deployed to support web server functions, (2) a second group having a maximum of three software image instances that may be deployed to support business application functions, and (3) a third group having a maximum of two software image instances that may be deployed to support database functions. Control node 12A utilizes the appropriate golden image to create the software image instances for each of the groups regardless of the number of software image instances that will initially be deployed for each of the functional groups.

For each image instance, control node 12A may pre-assign a network address, such as an Internet Protocol (IP) address and a host name, for use once the image instance is actually deployed on an application node. The network address may be assigned from a block of network addresses allocated to distributed computing system 10.

After creating and storing the image instances, control node 12A deploys all or a portion of the image instances. During this process, control node 12A selects the image instances to be deployed, possibly based on parameters provided by administrator 20, and associates the selected image instances with a respective one of application nodes 14 within distributed computing system 10. The remaining image instances are not assigned to specific application nodes at this time until actual deployment of the computing nodes. The computing nodes to which control node 12A assigns the image instances temporarily inherit the network address assigned to the image instance for as long as the image instance, or in some cases an associated patched image, is deployed on that particular application node. If for some reason the image instance is moved to a different application node 14, control node 12A moves the network address that new application node.

Different functional groups of application nodes 14 subsets are treated in a similar manner. Particularly, control node 12A creates image instances from a respective golden image for the maximum number computing nodes of the group, assigns network addresses to each of the pre-created image instances, stores the pre-created image instances within image repository 26, assigns one of the pre-created image instances to the each of application nodes 14 to be initially deployed for the group, and boots the assigned image instances on respective application nodes. Control node 12A maintains a mapping that associates each of the image instances with the assigned network address and tracks whether the image instance is booted on one of application nodes 14. Control node 12A may maintain the mapping within a relational database, such as SQL Server from Microsoft Corporation or PostgreSQL.

Pre-creation of image instances for future allocation may provide certain advantages. For example, pre-creation of image instances may reduce the amount of time required for deploying the image instances on unallocated nodes 16. Further, as explained in detail below, control node 12A allows the unassigned image instances within image repository 26 to be maintained and updated as if currently deployed. In this fashion, the image instances are in a current state and ready for assignment to an application node for deployment.

Control node 12A may also provide mechanisms for efficiently updating the image instances. For example, control node may provide efficient mechanisms for applying software patches to the image instances and for rollback of the image instance if desired. Control node 12A may provide a scheduled update process that periodically checks for and applies software updates, e.g., nightly or weekly. Alternatively, administrator 20 may manually invoke an image update process upon receiving a new patch for a particular software package or operating system.

When performing an update, control node 12A updates non-assigned image instances store within image repository 26 as well image instances deployed to application nodes 14. With respect to the deployed image instances, control node 12A may initiate and perform the image update process while maintaining the execution of as many of application nodes 14 as possible so that the disruption to distributed computing system 10 is reduced. For example, in some situations, control node 12A applies a rolling update across application nodes 14 so that only a single application node is offline at any time. Thus, control node 12A may update the software images of application nodes 14 in a relatively non-intrusive manner.

As described in further detail below, when applying a software update to a group of image instances, control node 12A first creates a clone of the golden image for the group of image instances to be updated. The clone of the golden image may be viewed as a bit for bit copy of the golden image. Control node 12A then temporarily boots the clone of the golden image on a computing node from the pool of unallocated computing nodes 16. Administrator 20 then applies the software update (e.g., patch) to the clone of the golden image, thus creating a patched golden image. Control node 12A computes a first set of differences ($S_1$) that specifies the differences between the original golden image and the patched golden image.

Control node 12A then proceeds to update each of the image instances of the group. For deployed image instances, control node 12A shuts down the application node 14 on which the image instance is deployed down and clones the image instance. Control node 12A then computes a second set of differences ($S_2$) that specifies the differences between the original golden image and the cloned image instance. Control node 12A propagates the computed set of differences ($S_1$) into the first cloned image instance, and reconciles those differences with the set of differences ($S_2$) between the original golden image and the cloned image instance. If there are no conflicts, control node 12A boots another application node 14 with the patched image instance. The image instances of the other application nodes 14 are sequentially cloned and updated in a similar fashion.

If any file conflicts are detected during the update of any of the image instances of the group, administrator 20 may select one of three actions. In particular, administrator 20 may direct control node 12A to: (1) use the file from the original image instance, (2) use the file from the updated golden image or (3) fail the update and rollback the updated image instance to the original image instance. For a rollback, control node 12A reboots application nodes 14 with the original image instances, i.e., the image instances prior to being cloned and patched.

Figure 2:
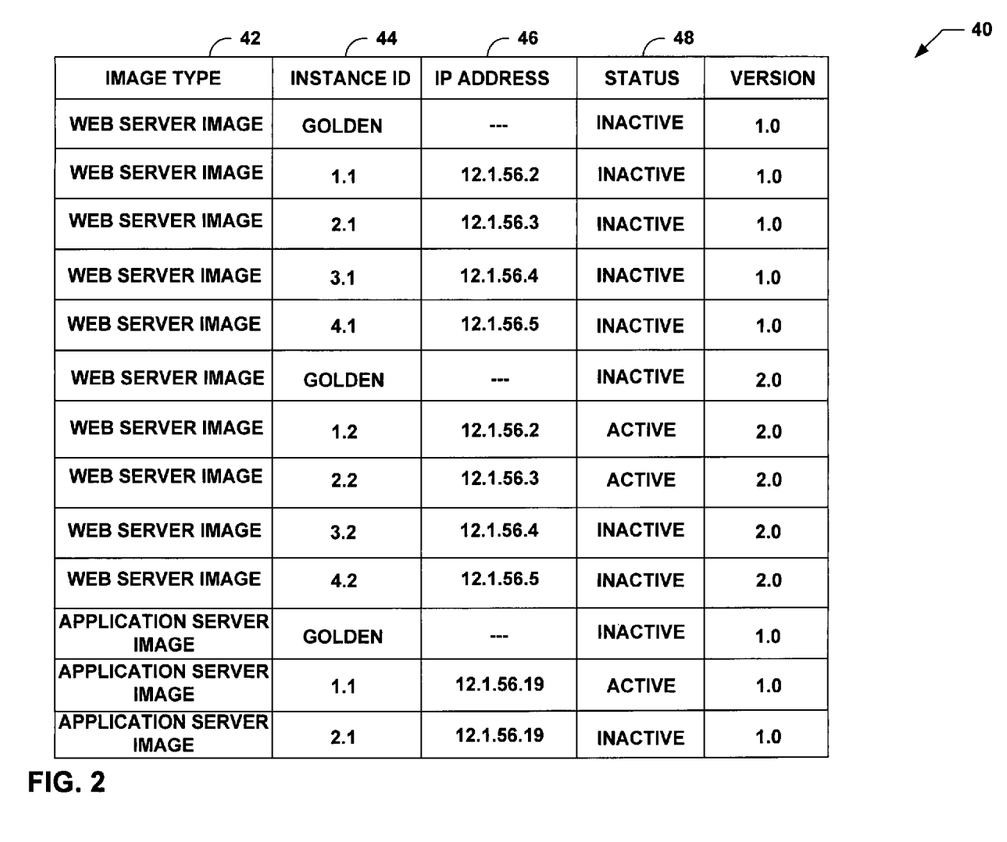
FIG. 2 is an exemplary image management data structure maintained by a control node in associated with a software image repository.

FIG. 2 is an exemplary image management data structure 40 maintained by control node 12A in association with image repository 26. In this example, image management data structure 40 is represented as a table in which each row represents a unique software image. The software images represented in data structure 40 may be golden images (represented by the instance identification "GOLDEN") or specific image instances.

For each software image, image management data structure 40 includes an image type 42 identifying the functional type of the software image. In the example illustrated in FIG. 2, image management data structure 40 includes two different types of software images: web server images and application server images. In addition, image management data structure 40 includes an instance identification 44 that identifies an instance number and a version of golden image from which the instance was created. For example, the web server image with an instance ID of 2.1 indicates that the instance is the second image instance created from the version 1.0 web server golden image.

Image management data structure 40 also includes an IP or other network address 46 associated with each of the images. As described above, the IP address associated with the image instance may be assigned from a block of IP addresses reserved for distributed computing system 10. As golden images are never deployed, IP addresses are not assigned. Other information may also be assigned, such as a host name.

Furthermore, image instance data structure 40 includes a status 48 of the image and the version of the image. The status of the image may either be "active" or "inactive." An image has a status of "active" if it is currently deployed on one of application nodes 14 of distributed computing system 10. Images that are not currently running on application nodes 14 are classified as "inactive." Golden images are always inactive, except when used during the update process. In the example illustrated in FIG. 2, of the four image instances created from the version 2.0 web server golden image only two are actively deployed on application nodes 14. Thus, as described in detail above, distributed computing system pre-creates image instances for future use on application nodes 14.

Control node 12A maintains entries for software images that have been updated. In the example illustrated in FIG. 2, control node 12A has updated web server image version 1.0 to version 2.0. Thus, in the example of FIG. 2, web server images having instance IDs of 1.2-4.2 are updated versions of web server images 1.1-4.1. Control node 12A maintains the image instances associated with version 1.0 in case a conflict is detected and the control node needs to rollback one or more of application nodes 14 to the original version of the image instances. As illustrated in image management data structure 40, control node 12A may assign the same IP address to an image instance and any corresponding updated instances. In some embodiments, however, the updated image instance may be assigned an IP address that is distinct from the parent image instance.

The data of FIG. 2 is illustrated for exemplary purposes, and may be subject to variation. For example, image management data structure 40 may further specify a type of operating system the image should be run on, a version of the operating system the image should be run on, an identifier (e.g., MAC address) for the application node to which an "active" image instance is assigned, and other data. Although image management data structure 40 is illustrated in FIG. 2 as a single image management data structure, image management data structure 40 may be divided into two or more data structures. For example, control node 12A may maintain a first image management data structure that maintains information associated with golden images and a second image management data structure that maintains information associated with image instances. Furthermore, image management data structure 40 may take forms other than a table, such as one or more databases, link lists, radix trees, databases, flat files, or any other data structures.

Figure 3:
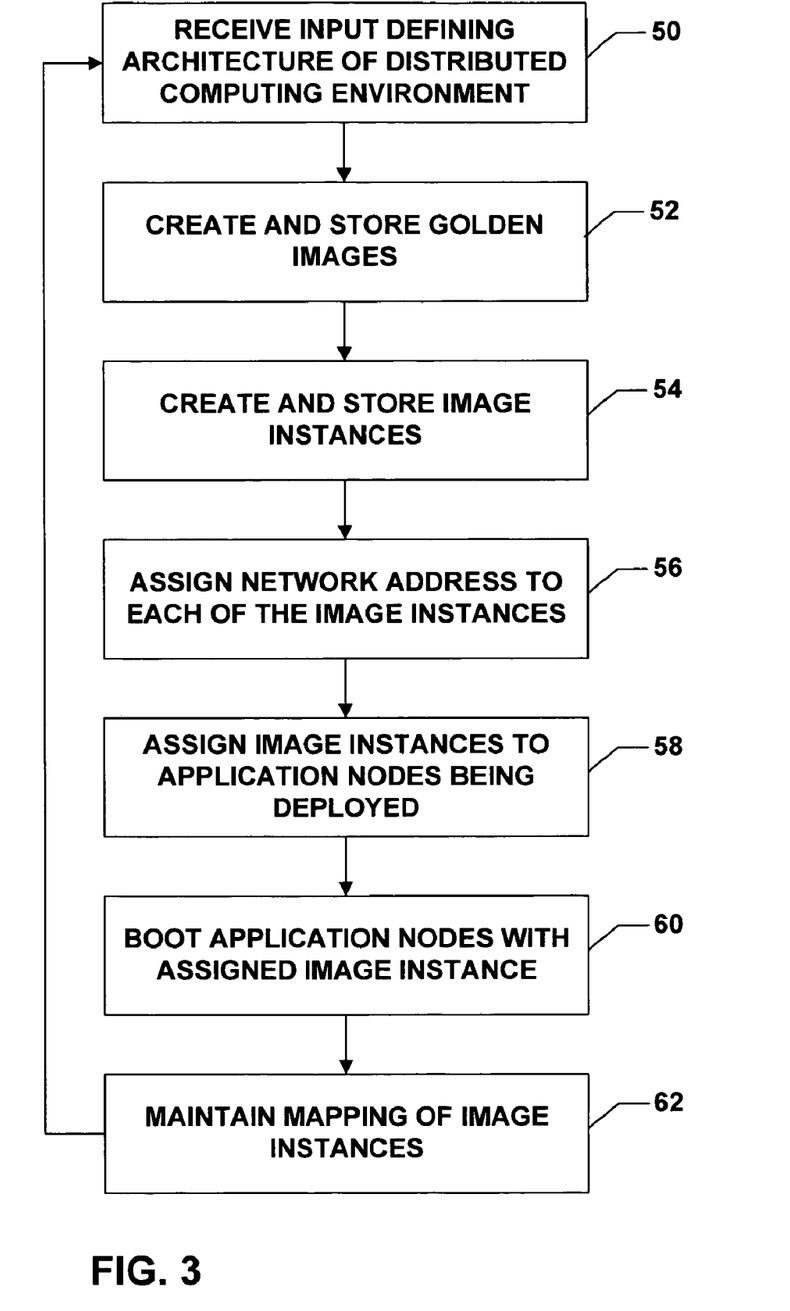
FIG. 3 is a flow diagram illustrating exemplary operation of the administration computing node when managing software images during configuration of a distributed processing environment.

FIG. 3 is a flow diagram illustrating exemplary operation of control node 12A when managing images during configuration of a distributed processing environment. Initially, control node 12A receives input defining an architecture of a distributed computing environment (50). Particularly, system administrator 20 accesses control node 12A and defines the architecture of distributed computing system 10. The system administrator may, for example, define the maximum number of application nodes 14 of system 10, an initial number of application nodes 14 to be deployed, the hardware requirements of each node, the type of each node (e.g., an application server node), and the like.

Control node 12A then generates and stores a golden image for each type of software image (i.e., computing function) to be deployed on application nodes 14 (52). As described above, the system administrator may create a golden image by temporarily installing and booting the drivers, operating system, middleware and applications on a computing node and then making a bit copy of the contents of the root partition, e.g., all files, the operating system, and applications.

Next, control node 12A creates image instances from the golden images and stores the image instances (54). Particularly, for each golden image, control node 12A creates the maximum number of image instances that may be deployed within distributed computing system 10 for the corresponding computing function. In this manner, control node 12A pre-creates image instances for subsequent allocation. Control node 12A may create the image instances by performing a bit-wise copy from the respective golden image. Control node 12A also assigns a network address to each of the image instances from a block of network addresses allocated to distributed computing system 10 (56). In one embodiment, each image instance consists of two parts: (1) a copy of those portions of the corresponding golden image that will be writable and, therefore, must be unique to each image instance, and (2) a read-only reference directly to the remaining portions of the golden image, thus allowing those portions to be shared by multiple image instances. This may allow for faster deployment.

Control node 12A selects the image instances that will be currently deployed, assigns the image instances to respective application nodes 14 (58), and deploys the image instances on their respectively nodes (60). In general, the term "deploy" refers to the process of configuring distributed computing system 10 to execute a particular software image instance on a particular application node 14. When deploying an image instance, for example, control node 12A may configure distributed computing system 10 so that the image instance is utilized for remotely booting the application node 14 to which the image instance is assigned (i.e., a network boot). This process may involve configuring a "pre-boot execution environment" (PXE) including a kernel, RAM disk, network interfaces or other information. Deploying an image instance may also include: (1) configuring a dynamic host communication protocol (DHCP) environment, including a root file system location, a hostname and an IP address, (2) configuring a dynamic virtualization service (DVS) environment, including a hostname and IP address, (3) configuring a domain name server (DNS) environment, (4) configuring a Network File System (NFS) environment, (5) configuring a NVDD environment and (6) configuring a secure shell (SSH) environment.

The assigned and unassigned image instances remain stored in image repository 26, the unassigned image instances reserved possibly used for later allocation to unallocated nodes 16. For example, control node 12A may allocate image instances and deploy unallocated nodes 16 when distributed computing system 10 experiences high processing loads. Control node 12A maintains data describing the allocated and unallocated image instances (62). As described above in referenced to FIG. 3, the data describes each image instance and may map the allocated image instances to corresponding application node.

Figure 4:
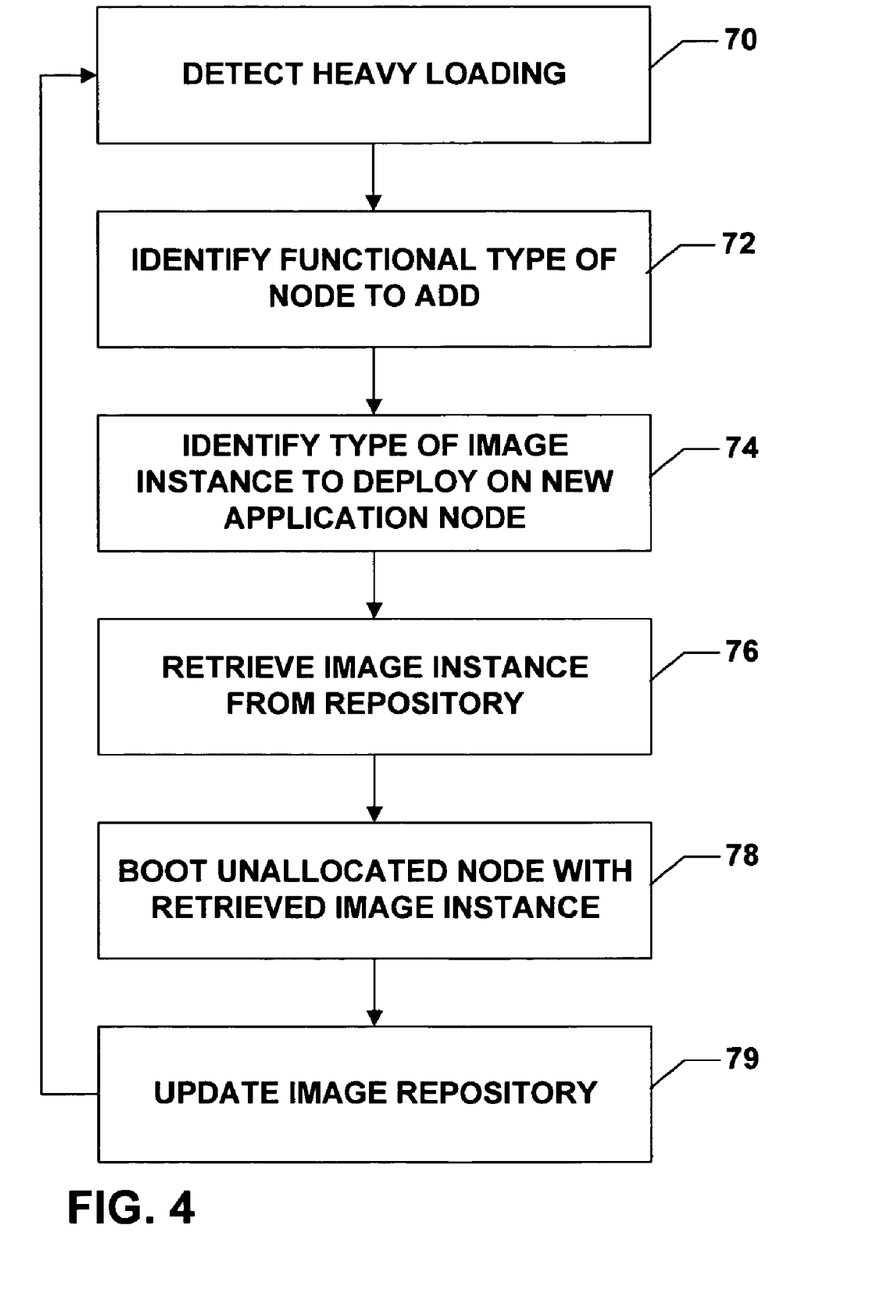
FIG. 4 is a flow diagram illustrating exemplary operation of the administration computing node when utilizing an unallocated computing node.

FIG. 4 is a flow diagram illustrating exemplary operation of control node 12A when utilizing one of unallocated nodes 16. Initially, administrator 20 or control node 12A identifies the need to increase computing bandwidth and add a new application node 14 to distributed computing system 10 (70). For example, control node 12A may automatically detect a high load on the currently deployed application nodes 14 and the need to bring another application node online. In another embodiment, system administrator 20 or other network monitor may identify the need to bring a new node online and input that need into control node 12A. As another example, control node 12A or administrator 20 may detect a failed application node and deploy a new application node with identical computing function.

Next, control node 12A or system administrator 20 identifies the particular type of node to allocate (72). As described above, for example, if application nodes executing web server software images are experiencing heaving loading, control node 12A may determine that a new web server application node needs to be brought online. Based on the determination, control node 12A selects an inactive (i.e., unassigned) image instance from image repository 26 to associate with the new application node (74). Continuing with the web server example, control node 12A selects an inactive image instance created from the web server golden image. For example, control node 12A may select an inactive software image created from a most current version of the web server golden image or the most recently updated image instance. With respect to FIG. 2, for example, control node 12A may select the web server image with instance identification number 2.3 or 2.4.

Control node 12A retrieves the identified image instance from image repository 26 (76), and boots one of unallocated nodes 16 with the retrieved image instance (78). Thus, the newly booted node is removed from the pool of unallocated nodes. As described above, the newly booted application node inherits the network address of the selected image instance for as long as the application node runs that particular image instance or an updated version of that particular image instance. Control node 12A updates the image repository 26 to reflect the assignment (79). For example, control node 12A may update image management data structure 40 to change the status of the image instance from "inactive" to "active," associates the image instance with a particular node, or the like.

Figure 5:
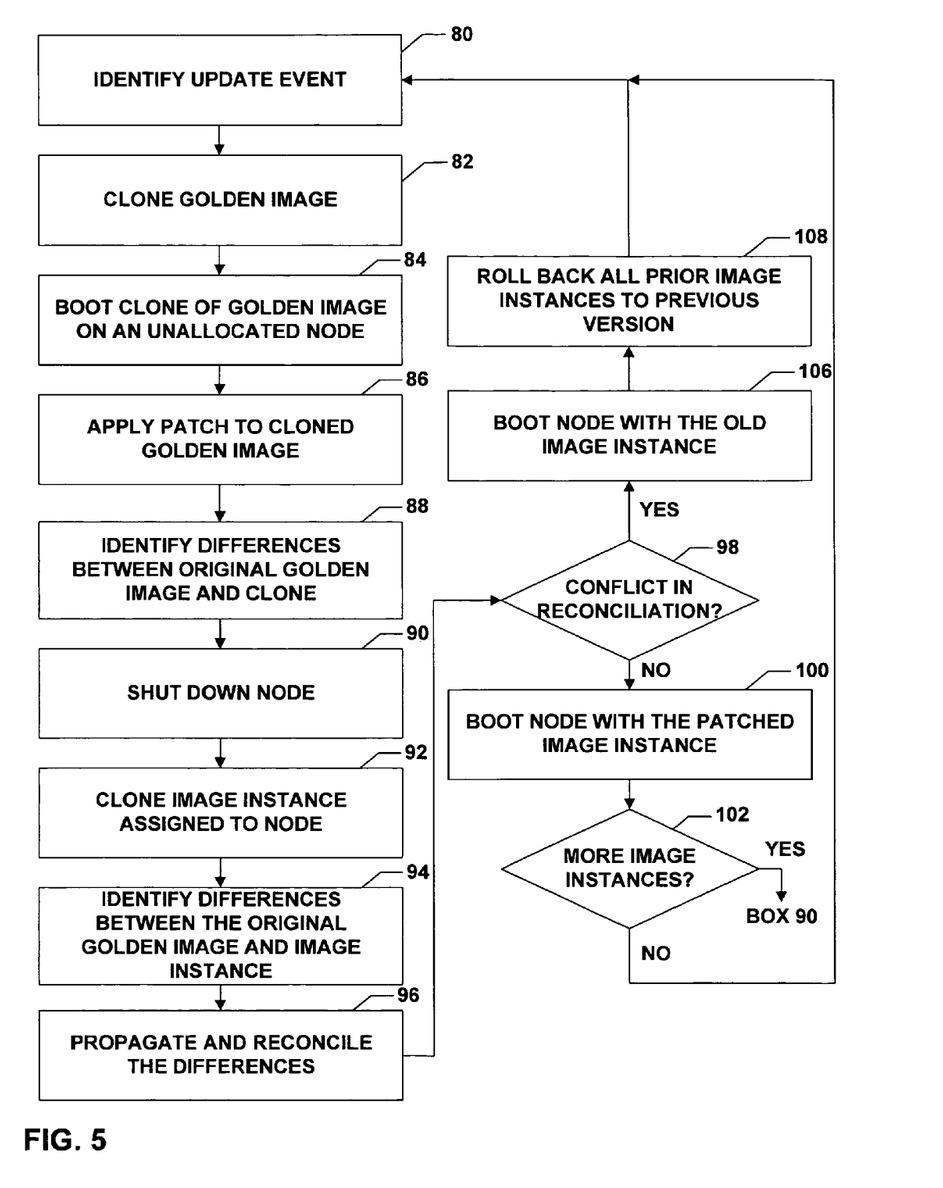
FIG. 5 is a flow diagram illustrating exemplary operation of the administration computing node when updating a software image.

FIG. 5 is a flow diagram illustrating exemplary operation of control node 12A when applying a software update. In the illustrated example, control node 12A performs image updating on a node-by-node basis while the other nodes continue operation so that the disruption to distributed computing system 10 is reduced.

Initially, control node 12A or administrator 20 detects an event identifying a need to update one or more image instances (80). Control node 12A may, for example, detect expiration of a timer in the case that image updates are performed periodically, detect receipt of a new software patch, or receives input from system administrator 20 in the case of a manually initiated update.

In any case, control node 12A clones (i.e., makes a bit copy of) the golden image associated with the image instances to be updated (82). Control node 12A deploys and boots the clone of the golden image on one of unallocated nodes 16 (84). Next, control node 12A or system administrator 20 applies the software patch or software update to the installed clone of the golden image, thus creating a patched golden image (86). After the patch is complete, control node 12A shuts down the node used for the patch.

Control node 12A computes a set that identifies the differences between the original golden image and the patched golden image, referred to herein as the golden image delta $S_1$ (88). In particular, control node 12A performs a file-by-file bit comparison (or optionally a checksum comparison) between the original golden image and the patched golden image to determine which files have been changed. Control node 12A may consider other information, such as a change in permissions or ownership associated with the files. Thus, the golden image delta $S_1$ includes a list of the files that have been changed in some manner by the patch. In addition, control node 12A may identify what specific changes have been made to the files.

Control node 12A then proceeds to update each of the image instances of the group being updated, i.e., each of the image instances created from the original golden image. For those image instances assigned to an active application node, control node 12A shuts down the application nodes (90) and clones the installed image instances (92). For those image instances that are not presently installed and assigned to active application nodes, control node 12A clones the image instances by performing a bit copy of the image instances.

Next, control node 12A computes a set that identifies the differences between the original golden image and the deployed image instance used to generate the clone. This set of differences is referred to herein as an image instance delta $S_2$ (94). As described briefly above, control node 12A may perform a file-by-file bit comparison (or optionally a checksum comparison) to identify the differences. The image instance delta includes a list of the files that have been changed in some manner during execution of the image instance on the particular computing node and, in some embodiments, the changes that have been made to the files.

Control node 12A propagates the changes identified by the golden image delta $S_1$ into the clone of the image instance and reconciles the changes with the delta $S_2$ (96). Specifically, control node 12A analyzes the intersection of the golden image delta $S_1$ with the image instance delta $S_2$. By doing so, control node 12A determines whether there are any overlapping changed files. For example, if the same system file was changed by installing and booting the image instance as well as by applying patch, control node 12A cannot reconcile the source of the change, thus resulting in a conflict.

If no conflicts are detected during the reconciliation, control node 12A stores the updated image instance and, if the instance is active, boots one of application nodes 14 of distributed computing system 10 with the updated image instance (98, 100). Control node 12A may, for example, boot one of unallocated nodes 16. In this case, the node on which the original image instance was executing may be placed in the pool of unallocated nodes. Alternatively, control node 12A installs and boots the updated image instance on the original application node on which the original image instance was executing, i.e., the application node shutdown by control node 12A.

Control node 12A determines whether there are any other image instances created from the same golden image remain to be updated (102). If so, control node 12A selects one of the image instances and repeats the update process. Control node 12A repeats this process until all of the image instances associated with the golden image being patched have been updated.

In the event control node 12A identifies a conflict during reconciliation (i.e., the intersection of delta $S_2$ and delta $S_2$ is not an empty set) administrator 20 may select one of three actions. In particular, administrator 20 may direct control node 12A to: (1) use the file from the original image instance, (2) use the file from the updated golden image or (3) fail the update and rollback the updated image instance to the original image instance. For rollback, control node 12A boots a computing node with the original image instance that was running prior to the upgrade (106). This process is referred to as rollback in the sense that the computing node is running the version of the image instance without the updates from the patch. As described above, the computing node on which the rollback occurs may be an unallocated node 16 or the same node that was shutdown at the beginning of the upgrade/patch process. In addition, control node 12A may perform rollbacks on all of the previous image instances in the group of images to which the update or patch has been applied (108).

Figure 6:
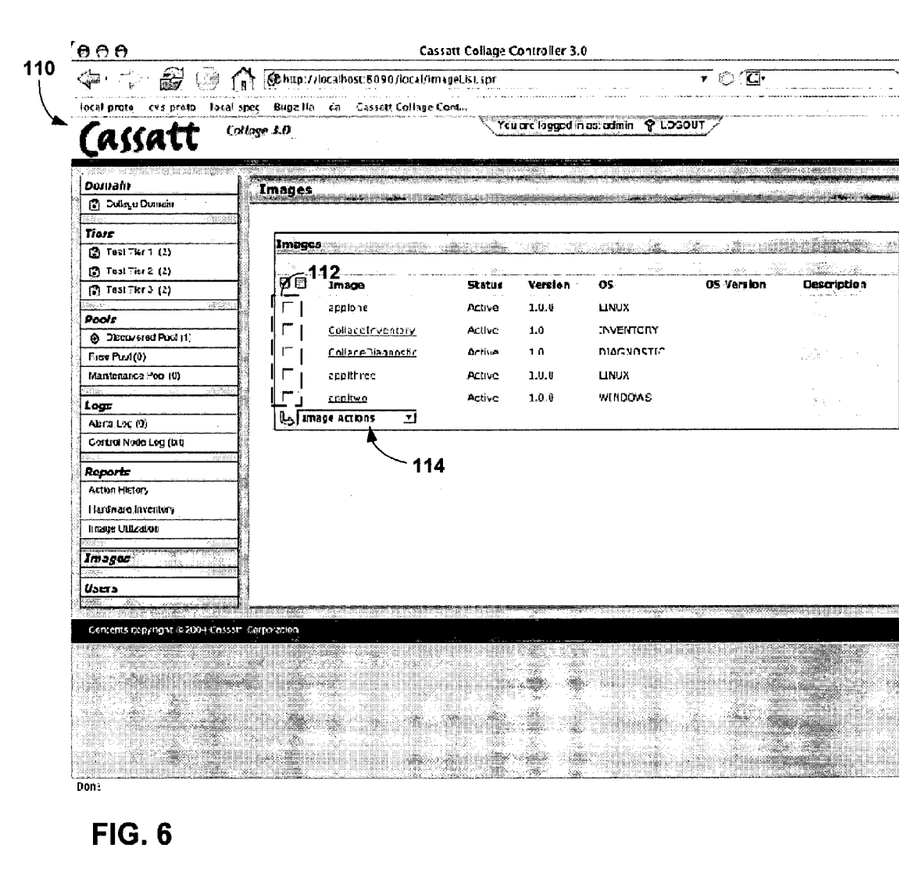
FIG. 6 is a screen illustration of an exemplary user interface for viewing and managing software images.

FIG. 6 is a screen illustration of an exemplary user interface 110 presented by a control node, such as control node 12A, for viewing and managing software images within distributed computing system 10. User interface 110 presents to a system administrator or other user a list of software images maintained by control node 12A. The list of images may include image instances, golden images or a combination thereof. Moreover, the list may include only the most current version of software images or all versions of the software images.

As illustrated in FIG. 6, user interface 110 presents the status of each software image (i.e., either active or inactive), the version of the image, the operating system and version on which the image should be run and a brief description of the software image.

The system administrator or other user may select one or more software image by selecting on input 112. Once selected, the user may perform an action on the selected images by selecting the action within menu 114. Actions that the system administrator may perform on the selected images include deleting the images, updating the images, and assigning the images to application nodes. In some embodiments, user interface 110 may display other details about the software images, such as the node to which the active images are assigned, the network addresses associated with the image instances and the like.

Figure 7:
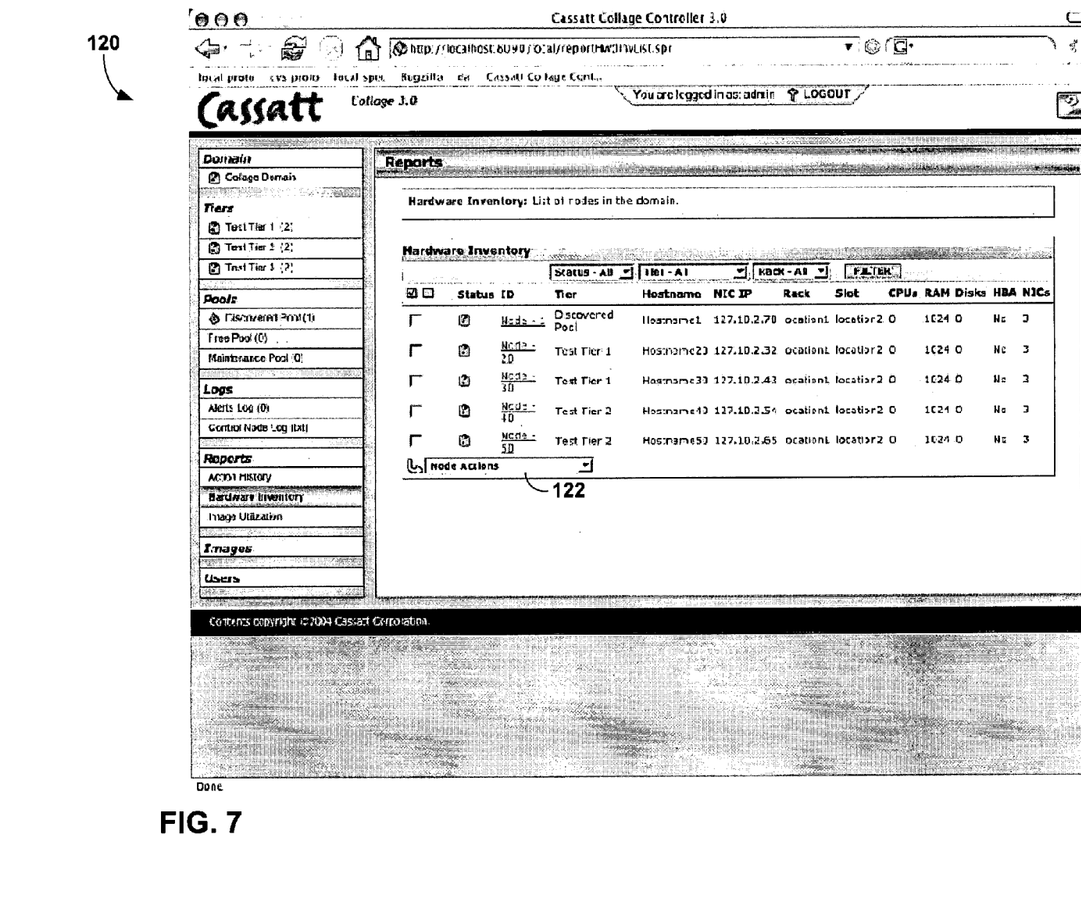
FIG. 7 is a screen illustration of an exemplary user interface for allowing a system administrator to select computing nodes for a software image upgrade.

FIG. 7 is a screen illustration of an exemplary user interface 120 with which a system administrator interacts to perform operations on computing nodes, such as application nodes 14. In this example, user interface 120 presents computing nodes that belong to a particular group (referred to as a "tier" in FIG. 7). An exemplary tier may comprise, for example, all computing nodes that operate as web servers.

After the system administrator selects a tier, user interface 120 present the user with a list of computing nodes that belong to the selected tier. The system administrator may then select one or more of the computing nodes and perform a management operation on the selected computing nodes by interacting with menu 122. For example, the system administrator may initiate an image update for each of the selected nodes. When updating images, the system administrator will typically select all the computing nodes running image instances that were created from a common golden image. Other examples of actions include deploying the node, de-allocating the node and moving the node to the free pool.

Figure 8:
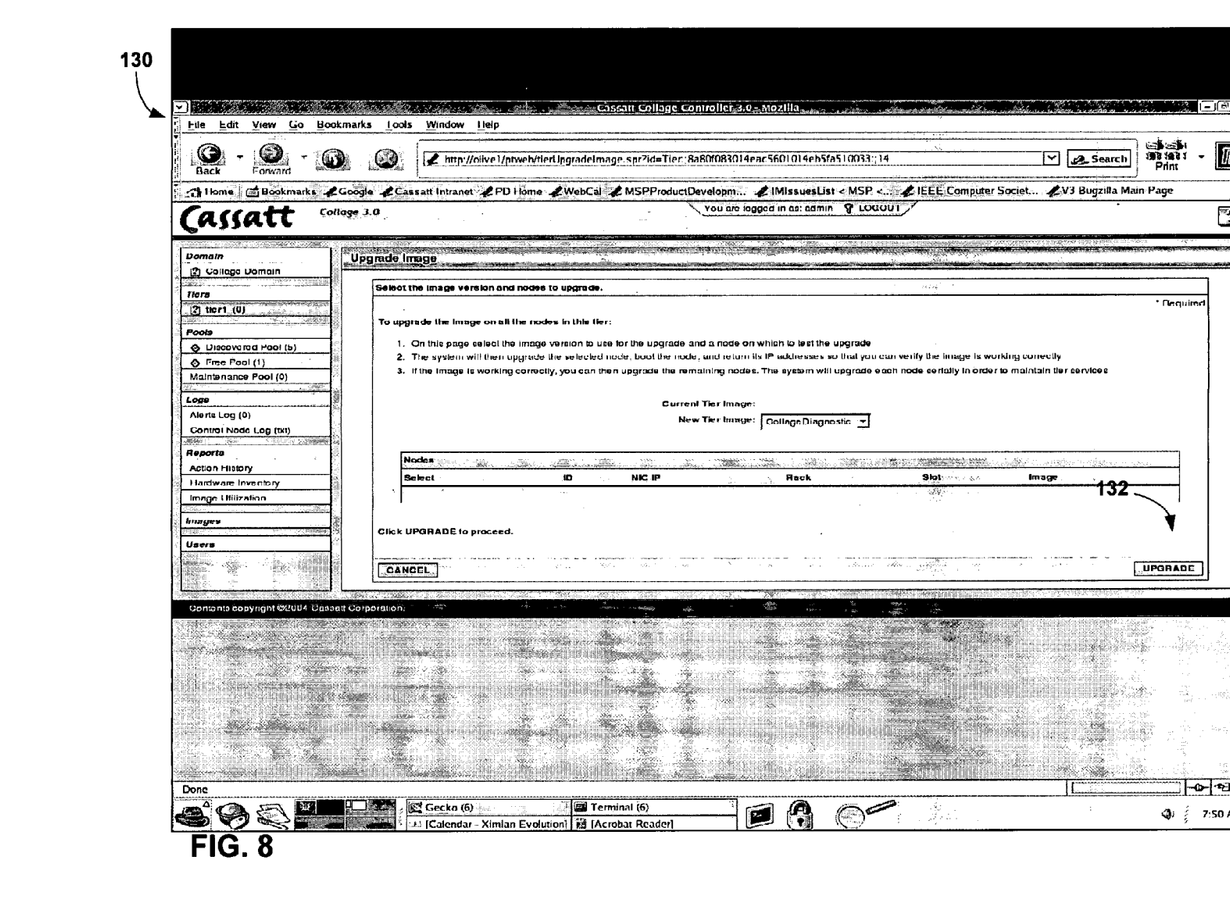
FIG. 8 is a screen illustration of an exemplary user interface for manually initiating software image updates.

FIG. 8 is a screen illustration of an exemplary user interface 130 presented by a control node 12A once the user administrator has manually initiated an image update. In particular, user interface 130 to select an image version and a first node on which to install the image upgrade. The system administrator may, for example, select an image from a dropdown list 132 that is populated with the images illustrated in user interface 130 of FIG. 6. The system administrator selects the appropriate image and then clicks on upgrade button 134.

Upon receiving the information selected by the system administrator, control node 12A updates a first one of the identified computing nodes as described in detail above. In the event the updated software image works correctly, the remaining nodes are updated serially as described in detail above.

Various embodiments of the invention have been described. These and other embodiments are within the scope of the following claims.

The invention claimed is:

1. A method comprising:
    storing a master software image for a type of computing function to be deployed within a distributed computing system;
    generating a plurality of software image instances from the master software image for deployment within the distributed computing system;
    applying a software update to the master software image to generate an updated master software image;
    computing a first set of differences, wherein the first set of differences specifies any differences between the master software image and the updated master software image;
    computing second sets of differences, wherein each of the second sets of differences specifies any differences between the master software image and one of the software image instances;
    computing an intersection of the first set of differences and the second set of differences;
    reconciling any conflicts between the first set of differences and a respective one of the second sets of differences based on the intersection;
    updating the software image instances to include differences in the first set of differences and differences in the respective one of the second sets of differences after reconciliation;
    wherein the updated master software image and the one of the software image instances are different; and
    wherein the first set of differences is different from the second set of differences.

2. The method of claim 1, further comprising deploying a subset of the updated image instances on application nodes within the distributed computing system.

3. The method of claim 1, wherein applying a software update comprises:
    copying the master software image associated with the set of image instances; and
    applying the software update to the copy of the master software image to generate the updated master software image.

4. The method of claim 1, wherein the first set of differences and the second set of differences specify modified files.

5. The method of claim 1, further comprising reconciling the first set of differences with the second set of differences when the intersection is not an empty set.

6. The method of claim 5, wherein reconciling the first set of differences with the second set of differences further comprises presenting an interface to allow a system administrator to reconcile one or more modified files specified by the intersection.

7. The method of claim 6, wherein the user interface allows the system administrator to elect to use the modified files from the updated image instance, elect to use the modified files from the updated master software image or elect to rollback the updated image instances to the selected image instances prior to application of the software update.

8. The method of claim 1, wherein computing a first set of differences that specifies any differences between the master software image and the updated master software image comprises performing a file-by-file bit comparison to identify files that have been changed due to the software update.

9. The method of claim 1, further comprising:
receiving input from a system administrator; and
applying the software update in response to the input.

10. The method of claim 1, wherein the master software image and the plurality of software image instances are based on a same version of software image.

11. The method of claim 1, wherein the master software image is a first version master software image, and the updated master software image is a second version master software image, wherein generating the plurality of software image instances from the master software image comprises generating the plurality of software image instances from the first version master software image, wherein each of the second sets of differences specifies any differences between the first version master software image and one of the software image instances generated from the first version master software image.

12. A distributed computing system comprising:
a plurality of application nodes interconnected via a network;
an image repository storing a master software image and a plurality of software image instances generated from the master software image; and
a control node, having a processor, coupled to the network, wherein the control node automatically computes a first set of differences, wherein the first set of differences specifies any differences between the master software image and an updated master software image,
wherein the control node automatically computes second sets of differences, wherein each of the second sets of differences specifies any differences between the master software image and one of the software image instances,
wherein the control computes an intersection of the first set of differences and the second set of differences;
wherein the control node reconciles any conflicts between the first set of differences and a respective one of the second sets of differences based on the intersection; and
wherein the control node automatically updates the software image instances to include differences in the first set of differences and the differences in the respective one of the second sets of differences after reconciliation;
wherein the updated master software image and the one of the software image instances are different; and
wherein the first set of differences is different from the second set of differences.

13. The distributed computing system of claim 12, wherein the updated version of the master software image is generated by application of a software update to the master software image.

14. The distributed computing system of claim 12, wherein the control node deploys a subset of the software image instances on the application nodes within the network.

15. The distributed computing system of claim 12, wherein control node computes the first set of differences and the second set of differences by detecting modified files.

16. The distributed computing system of claim 12, wherein the control node presents an interface to allow a system administrator to:
elect to use the modified files from the selected image instance,
elect to use the modified files from the updated master software image, or
elect to rollback the updated image instances to the selected image instances prior to application of the software update.

17. A non-transitory computer-readable medium comprising instructions that cause a programmable process to:
access an image repository and select one of a plurality of software image instances generated from a master software image;
select one of the image instances;
create a copy of the selected image instance;
compute a first set of differences $S_1$ that specifies any differences between the master software image and an updated master software image;
compute a second set of differences, wherein the second set of differences specifies any differences between the master software image and the selected image instance;
computing an intersection of the first set of differences and the second set of differences;
reconcile any conflicts between the first set of differences and a respective one of the second sets of differences based on the intersection; and
update the selected software image instance to include differences in the first set of differences and differences in the respective one of the second sets of differences after reconciliation;
wherein the updated master software image and the one of the software image instances are different; and
wherein the first set of differences is different from the second set of differences.

18. A method comprising:
deploying, to a plurality of computing nodes, a plurality of software image instances created from an original master software image;
applying a software update to the original master software image to generate an updated master software image;
computing a first set of differences, wherein the first set of differences specifies any differences between the original master software image and the updated master software image;
computing a second set of differences, wherein the second set of differences specifies any differences between the original master software image and one of the software image instances deployed on one of the computing nodes, wherein data in the one of the software image instances is allowed to change during execution of the one of the software image instances on the one of the computing nodes;
creating an intersection of the first set of differences and the second set of differences;
identifying a conflict between the first set of differences and the second set of differences through analysis of the intersection;
reconciling the conflict between the first set of differences and the second set of differences;
updating the one of the software image instances to include differences in the first set of differences and differences in the second set of differences after reconciliation;
wherein the updated master software image and the one of the software image instances are different; and
wherein the first set of differences is different from the second set of differences.

* * * * *